US009069149B2

(12) United States Patent
Yu (10) Patent No.: US 9,069,149 B2
(45) Date of Patent: Jun. 30, 2015

(54) FLEXIBLE SWITCH PACK (71) Applicant: CommScope, Inc. of North Carolina, Hickory, NC (US)

(72) Inventor: Zhao Yu, Jiangsu (CN)

(73) Assignee: CommScope, Inc. of North Carolina, Hickory, NC (US)

( * ) Notice: Subject to any disclaimer, the term of this patent is extended or adjusted under 35 U.S.C. 154(b) by 342 days.

(21) Appl. No.: 13/847,790

(22) Filed: Mar. 20, 2013

(65) Prior Publication Data

US 2014/0270675 A1 Sep. 18, 2014

(30) Foreign Application Priority Data

Mar. 15, 2013 (CN) .......................... 2013 1 0082588

(51) Int. Cl.
G02B 6/00 (2006.01)
G02B 6/44 (2006.01)
H01R 13/518 (2006.01)
H01R 13/627 (2006.01)
H01R 13/633 (2006.01)
H01R 43/26 (2006.01)
H04Q 1/02 (2006.01)
G02B 6/38 (2006.01)

(52) U.S. Cl.
CPC .............. G02B 6/4452 (2013.01); Y10T 29/53 (2015.01); G02B 6/3879 (2013.01); H01R 13/518 (2013.01); H01R 13/6275 (2013.01); H01R 13/6335 (2013.01); H01R 43/26 (2013.01); H04Q 1/02 (2013.01); H01R 2201/04 (2013.01); G02B 6/3897 (2013.01); G02B 6/3898 (2013.01)

(58) Field of Classification Search
USPC ......................................................... 385/135
See application file for complete search history.

(56) References Cited

U.S. PATENT DOCUMENTS

| 4,084,882 | A | * | 4/1978 | Hogan et al. .................... 385/78 |
| 4,767,355 | A | | 8/1988 | Phillipson et al. |
| 5,125,854 | A | | 6/1992 | Bassler et al. |
| 6,109,978 | A | | 8/2000 | Stellman et al. |
| 6,123,564 | A | | 9/2000 | Belmore, III |
| 6,343,950 | B1 | | 2/2002 | Eginton et al. |
| 6,547,585 | B2 | | 4/2003 | Bradley et al. |
| 6,857,900 | B2 | | 2/2005 | Kleeberger et al. |
| 7,140,911 | B1 | | 11/2006 | Rector et al. |

(Continued)

FOREIGN PATENT DOCUMENTS

JP 2003-229197 A 8/2003
JP 2010-530121 A 9/2010
KR 10-2012-0031964 A 4/2012

Primary Examiner — Sung Pak
(74) Attorney, Agent, or Firm — Muncy, Geissler, Olds & Lowe, P.C.

(57) ABSTRACT

A switch pack holds rows and columns of connector plugs and permits collective coupling of the plugs into ports. The switch pack includes a housing having a front face with front openings and a rear face with rear openings. An internal frame forms channels between the front openings and the rear openings, each channel holding a respective connector plug. One or more locking members releasably snap lock to the frame. Each locking member includes at least one blocking edge which extends into a channel and blocks removal of the channel's plug via the rear opening. A release tool for the switch pack includes a first wall with first tabs and a second wall with second tabs, connected to the first wall by a third wall. Each of the first and second tabs protrudes into a channel of the first and second rows of channels to depress a plug latch.

20 Claims, 9 Drawing Sheets

(56) References Cited

U.S. PATENT DOCUMENTS

| | | | |
|---|---|---|---|
| 7,194,178 B2 * | 3/2007 | Nakano | 385/134 |
| 7,374,447 B2 | 5/2008 | Matsumoto | |
| 7,381,087 B2 | 6/2008 | Alvarez | |
| 7,503,802 B2 | 3/2009 | Tu et al. | |
| 7,976,346 B2 * | 7/2011 | Guy et al. | 439/638 |
| 8,167,638 B2 * | 5/2012 | Wojcik et al. | 439/352 |
| 8,221,160 B2 | 7/2012 | Liu et al. | |
| 2002/0193016 A1 | 12/2002 | Bradley et al. | |
| 2005/0276560 A1 * | 12/2005 | Reinert et al. | 385/134 |
| 2011/0312203 A1 | 12/2011 | Liu et al. | |
| 2012/0190230 A1 | 7/2012 | Wojcik et al. | |

* cited by examiner

FLEXIBLE SWITCH PACK

BACKGROUND OF THE INVENTION

1. Field of the Invention

The present invention relates to the technical field of optical or electrical plugs and ports. In particular, the present invention relates to a device to hold multiple plugs, which allows the multiple plugs to be simultaneously mated and unmated with a plurality of ports.

2. Description of the Related Art

Several switch pack devices are known in the prior art for holding multiple plug connectors, such as electrical or optical plugs, wherein the switch pack device permits the plugs to be simultaneously mated and unmated to a row, or multiple rows, of ports.

The following US patents and published applications show the general state of the art of such devices, and the disclosures of each of these US patents or US published patent applications are herein incorporated by reference: U.S. Pat. Nos. 6,123,564; 6,857,900; 7,140,911; 7,374,447; 7,381,087; 8,167,638; and US Published Patent Application 2011/0312203.

SUMMARY OF THE INVENTION

Although the devices of the prior art perform their intended purposes with regard to permitting plural plugs to be mated and unmated to a row or rows of ports, Applicant has appreciated drawbacks to the devices and potential improvements to the devices.

For example, the switch pack devices of the prior art are generally difficult to remove once all of the plugs are mated to all of the ports. The user may need enhanced dexterity and/or increased finger strength to actuate the unlatching process.

As another example, several of the switch pack devices of the prior art do not allow for the removal of a single plug from the switch pack device without unlatching and disconnecting all of the plugs held by the switch pack device from their respective ports. Switch pack devices of the prior art which do allow the removal of a single plug from the switch pack device are cumbersome in the manner by which a plug can be removed from the device.

Also, the switch pack devices of the prior art are designed for one particular plug size and/or style, and will not function with a differently sized plug or differently styled plug.

It is an object of the present invention to address one or more of the noted drawbacks of the existing devices and/or to provide structural enhancements to the devices of the prior art.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1:
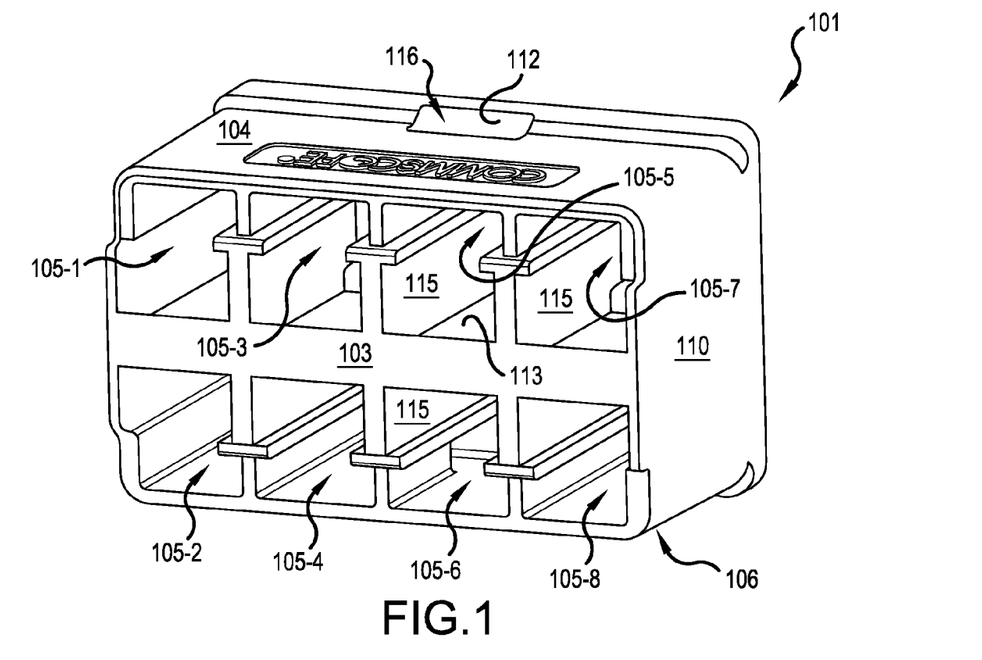
FIG. 1 is a front perspective view of an empty housing of a switch pack, in accordance with the present invention.
Figure 2:
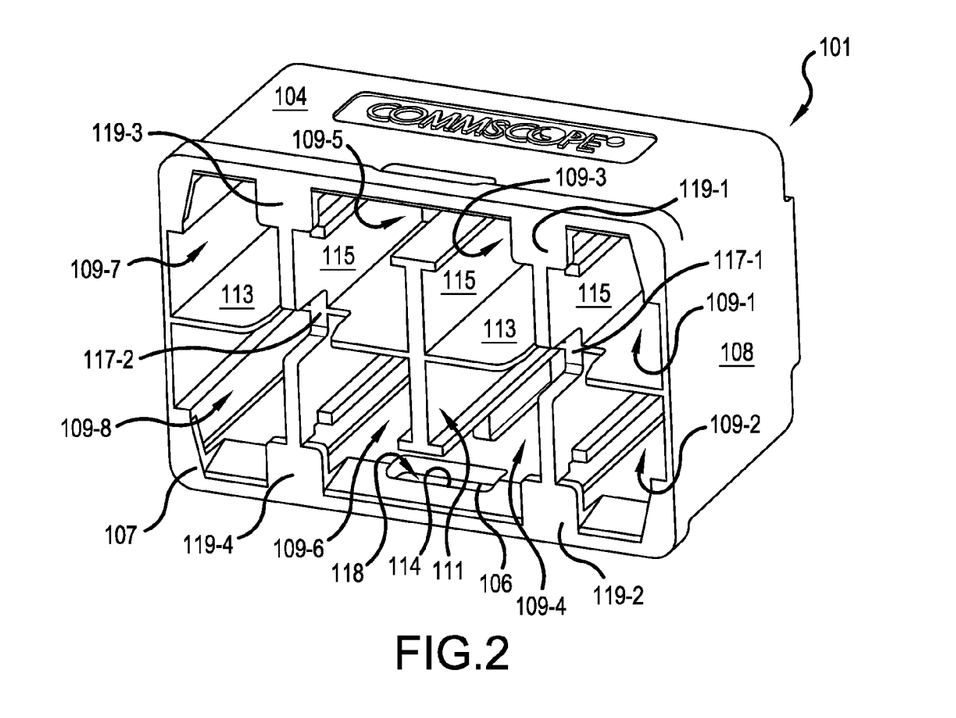
FIG. 2 is a rear perspective view of the housing of FIG. 1.

As shown in the front and rear perspective views of FIGS. 1 and 2, respectively, a switch pack housing 101 includes a front face 103 with a plurality of front openings 105-1 through 105-8. The housing 101 also includes a rear face 107 with a plurality of rear openings 109-1 through 109-8.

The housing has a first outer wall 104, an opposite, second outer wall 106, and two outer side walls 108 and 110, which connect the first and second outer walls 104 and 106. A first latch receiving lip 112 is located on the first outer wall 104, and a second latch receiving lip 114 is located on the second outer wall 106. The first latch receiving lip 112 is an edge of a first through hole 116 passing through the first outer wall 104, and the second latch receiving lip 114 is an edge of a second through hole 118 passing through the second outer wall 106.

The housing 101 has an internal frame 111, disposed between the first and second outer walls 104 and 106, and between the two outer sidewalls 108 and 110. The internal frame 111 includes one or more horizontal platforms 113 connected to one or more vertical walls 115. The rear of the frame 111 includes retaining features 119, such as inwardly extending walls 119-1, 119-2, 119-3 and 119-4, which may be co-planar with, and form a portion of, the rear face 107. The horizontal platforms 113 and vertical walls 115 may be notched at their intersections to form first and second docks 117-1 and 117-2, which are inwardly extending void spaces.

The frame 111 forms a plurality of channels passing from the front openings 105-1 through 105-8 on the front face 103 to the rear openings 109-1 through 109-8 on the rear face 107, respectively. In the embodiment of FIGS. 1 and 2, the frame includes two rows of channels with four channels in each row, or alternatively stated four columns of channels with two channels in each column. Each channel is sized to receive a respective connector plug, as will be described and illustrated in more detail hereinafter.

Figure 3:
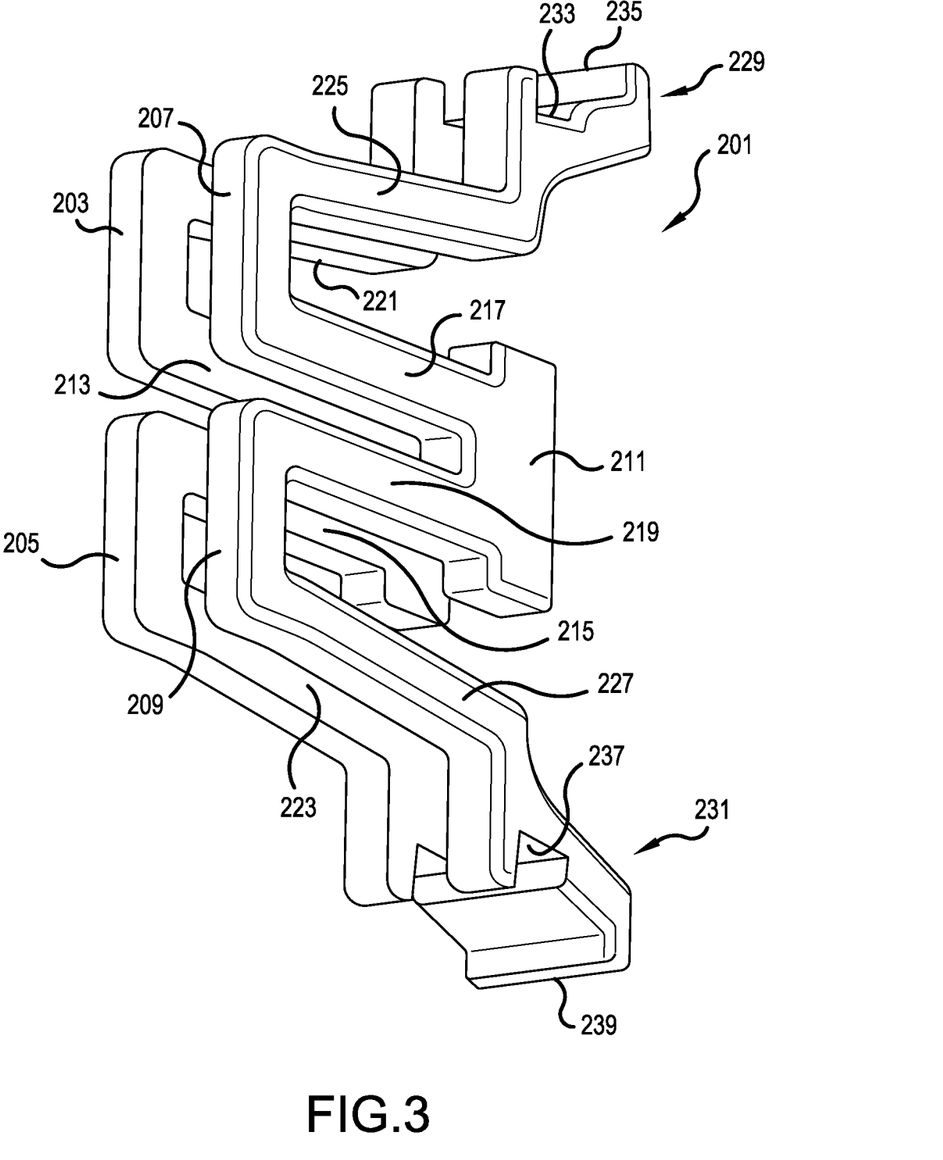
FIG. 3 is a front perspective view of a locking member for attachment to a frame of the housing.
Figure 4:
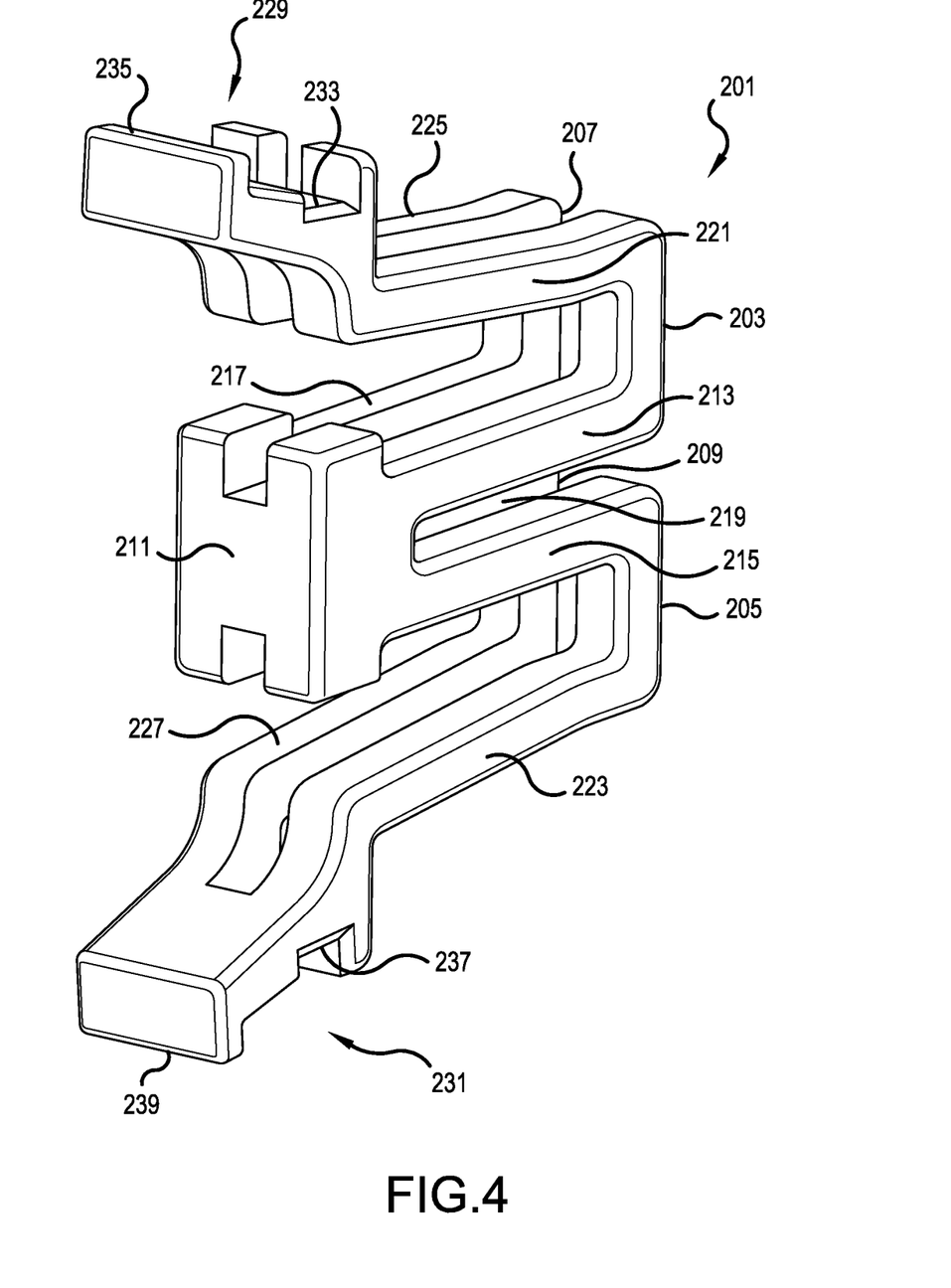
FIG. 4 is a rear perspective view of the locking member of FIG. 3.
Figure 5:
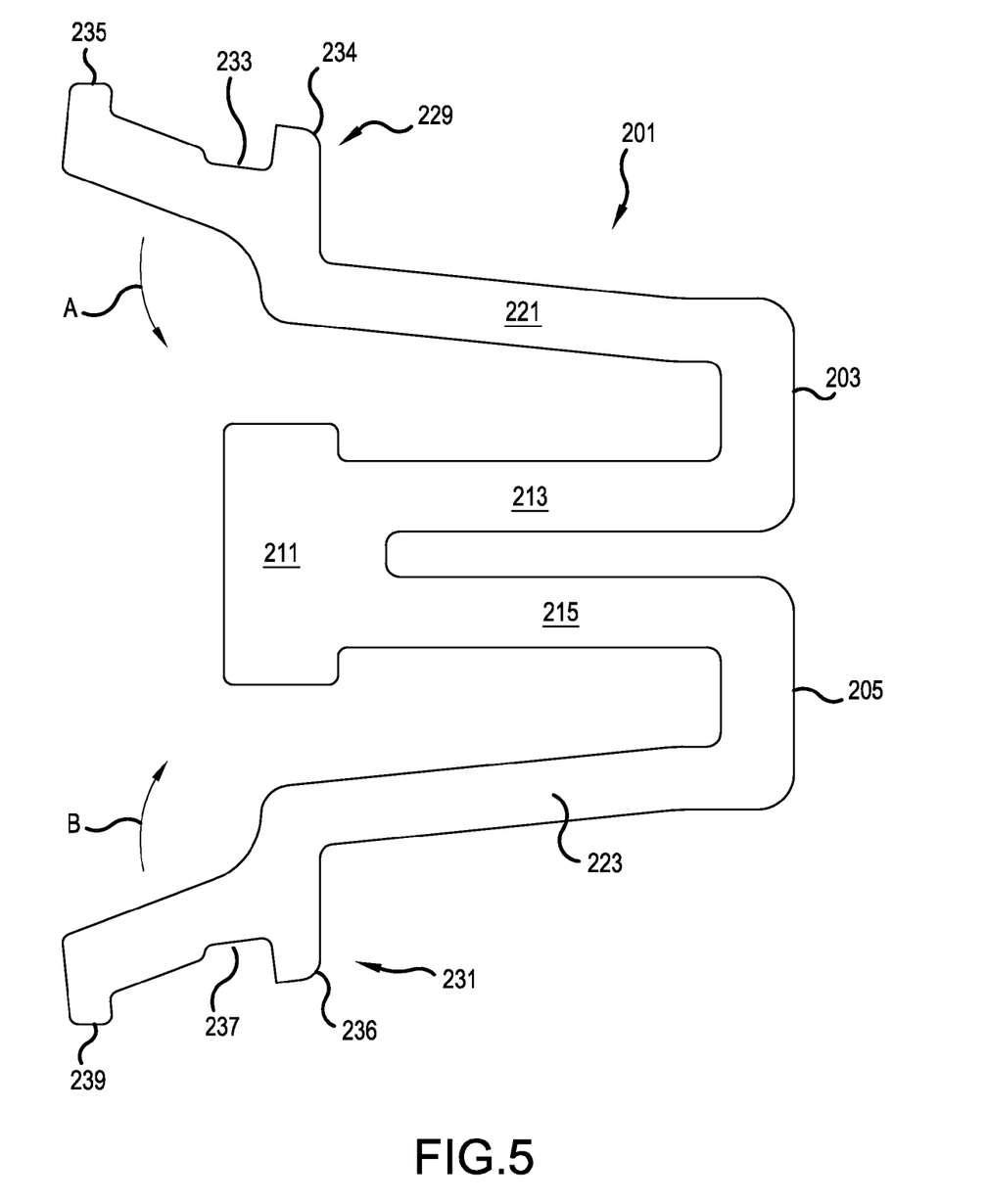
FIG. 5 is a side view of the locking member of FIG. 4.

As shown in the front and rear perspective views of FIGS. 3 and 4, respectively, and in the side view of FIG. 5, a first locking member 201 includes a first blocking edge 203, a second blocking edge 205, a third blocking edge 207 and a fourth blocking edge 209. The first, second, third and fourth blocking edges 203, 205, 207 and 209 have first sides connected to a common spine 211 by first, second, third and fourth intermediate legs 213, 215, 217 and 219, respectively. First, second, third and fourth extension legs 221, 223, 225 and 227 extend away from opposite, second sides of the first, second, third and fourth blocking edges 203, 205, 207 and 209, respectively. The first and third extension legs 221 and 225 are connected to a first latch pod 229. The second and fourth extension legs 223 and 227 are connected to a second latch pod 231.

The first latch pod 229 has a first cradle 233 and a finger button 235. The second latch pod 231 has a second cradle 237 and a thumb button 239. The material used to form the first, second, third and fourth extension legs 221, 223, 225 and 227 has flexible and resilient properties, like plastic. The first latch pod 229 may be moved toward the spine 211, in the direction of arrow A in FIG. 5, and the second latch pod 231 may be moved toward the spine 211, in the direction of arrow B in FIG. 5, by manual pinching finger/thumb pressure applied to the finger and thumb buttons 235 and 239. The first and second latch pods 229 and 231 will return to their initial positions in FIG. 5, once the pinching pressure is removed due to the resiliency of the material used to form the first, second, third and fourth extension legs 221, 223, 225 and 227.

The first blocking edge 203 of the first locking member 201 is sized to enter the frame 111 from a first rear opening 109-1 of the plurality of rear openings 109. The first blocking edge 203 extends into a first channel of the plurality of channels to a limited extent such that the first blocking edge 203 does not pass out of a first front opening 105-1 of the plurality of front openings 105. The second blocking edge 205 of the first locking member 201 is sized to enter the frame 111 from a second rear opening 109-2. The second blocking edge 205 extends into a second channel to a limited extent such that the second blocking edge 205 does not pass out of a second front opening 105-2. The third blocking edge 207 of the first locking member 201 is sized to enter the frame 111 from a third rear opening 109-3. The third blocking edge 207 extends into a third channel to a limited extent such that the third blocking edge 207 does not pass out of a third front opening 105-3. The fourth blocking edge 209 of the first locking member 201 is sized to enter the frame 111 from a fourth rear opening 109-4. The fourth blocking edge 209 extends into a fourth channel to a limited extent such that the fourth blocking edge 209 does not pass out of a fourth front opening 105-4.

Figure 6:
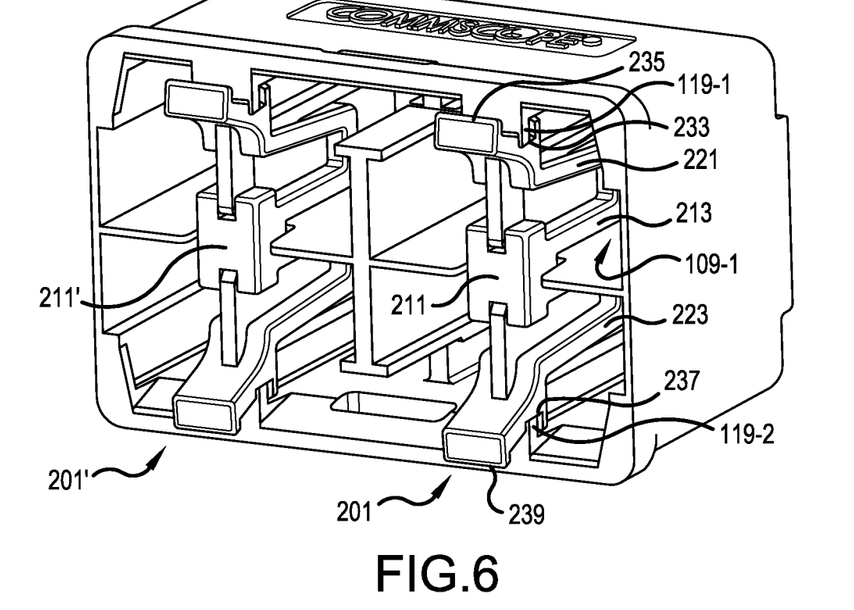
FIG. 6 is a rear perspective view of locking members attached to the housing depicted in FIG. 2.

The first locking member 201 may be releasably secured to the frame 111, as best depicted in FIG. 6. Basically, the first locking member 201 has its first, second, third and fourth blocking edges 203, 205, 207 and 209 slid into the first, second, third and fourth rear openings 109-1, 109-2, 109-3 and 109-4 until the spine 211 seats into the dock 117-1. As the spine 211 is seating into the dock 117-1, the first, second, third and fourth extension legs 221, 223, 225 and 227 will be bowed inwardly toward the spine 211 (directions A and B in FIG. 5) to allow the retaining features 119-1 and 119-2 to snap into the first and second cradles 233 and 237, respectively.

The first, second, third and fourth extension legs 221, 223, 225 and 227 may be bowed by pinching finger/thumb pressure applied to the finger and thumb buttons 235 and 239, or linear insertion pressure acting in combination with ramped surfaces formed on the edges of the retaining features 119-1 and 119-2 and/or ramped surfaces 234 and 236 on the latch pods 229 and 231 leading into the cradles 233 and 237.

Figure 7:
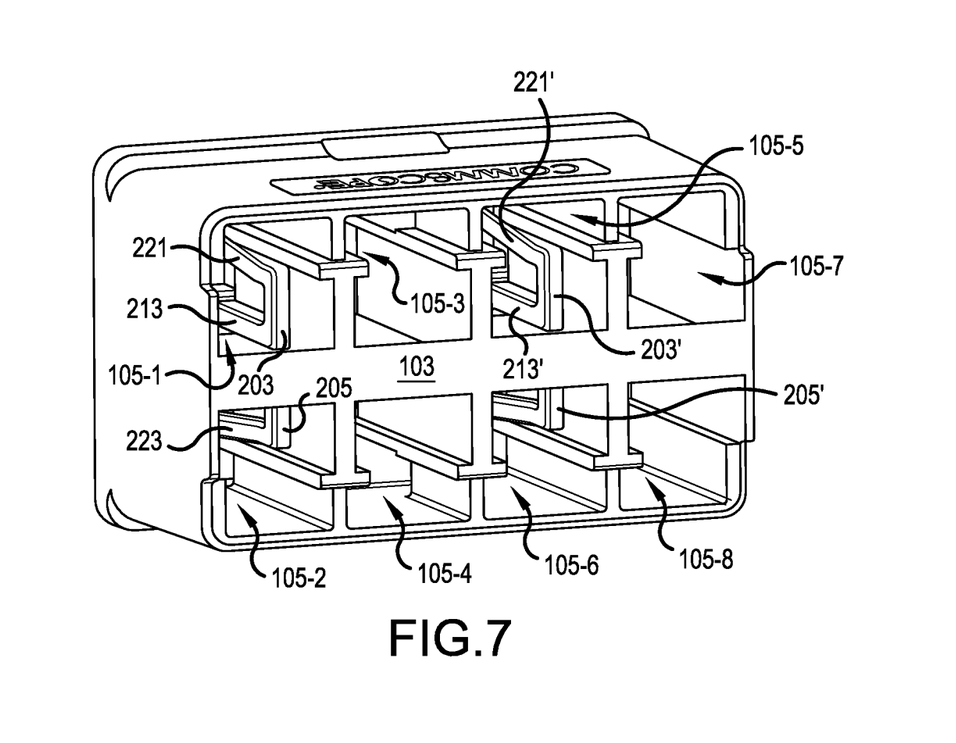
FIG. 7 is a front perspective view of the arrangement of FIG. 6.

Once the spine 211 seats into the dock 117-1, the first locking member 201 will be snap locked to the retaining features 119-1 and 119-2 of the frame 111, as shown in the rear perspective view of FIG. 6. More specifically, the first cradle 233 will snap over the first retaining feature 119-1 and the second cradle 237 will snap over the second retaining feature 119-2. As shown in the front perspective view of FIG. 7, the first, second, third and fourth blocking edges 203, 205, 207 and 209 remain inside the channels of the frame 111 and do not protrude out of the first, second, third and fourth front openings 105-1, 105-2, 105-3 and 105-4. FIGS. 6 and 7 depict that a second locking member 201' is snap locked into the fifth, sixth, seventh and eighth channels of the frame 111. The second locking member 201' is constructed identical to the first locking member 201, and its corresponding structures will be designated with a prime symbol (') after the same reference numerals. The second locking member 201' has its first, second, third and fourth blocking edges 203', 205', 207' and 209' residing within the fifth, sixth, seventh and eighth channels of the frame 111, to a limited extent so as to not protrude out of the fifth, sixth, seventh and eighth front openings 105-5, 105-6, 105-7 and 105-8.

FIGS. 6 and 7 have illustrated how the first and second locking members 201 and 201' are snap locked to the frame 111. However, during use of the present invention, corded connector plugs would first be populated into the channels of the frame 111 before the first and second locking members 201 and 201' are snap locked to the frame 111.

Figure 8:
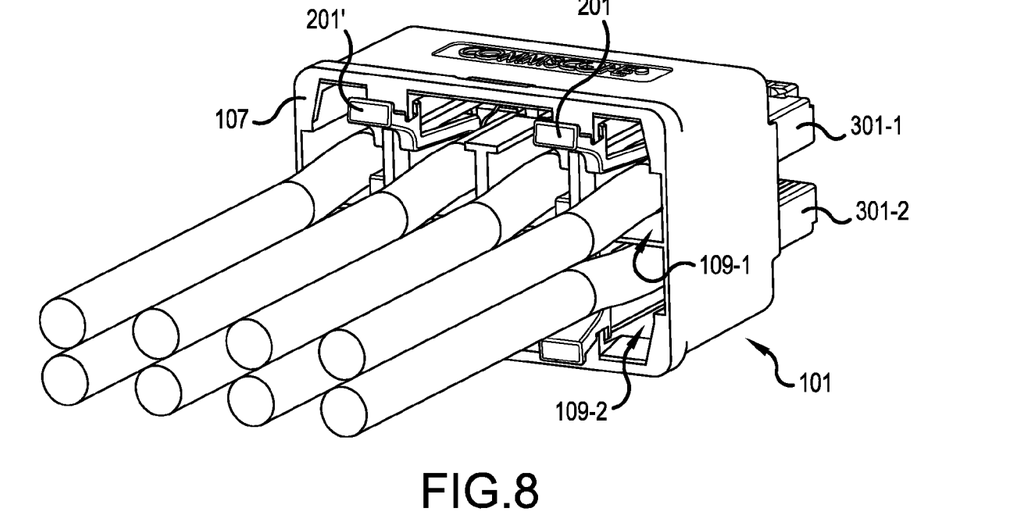
FIG. 8 is the rear perspective view of the switch pack of FIG. 6 populated with connector plugs.
Figure 9:
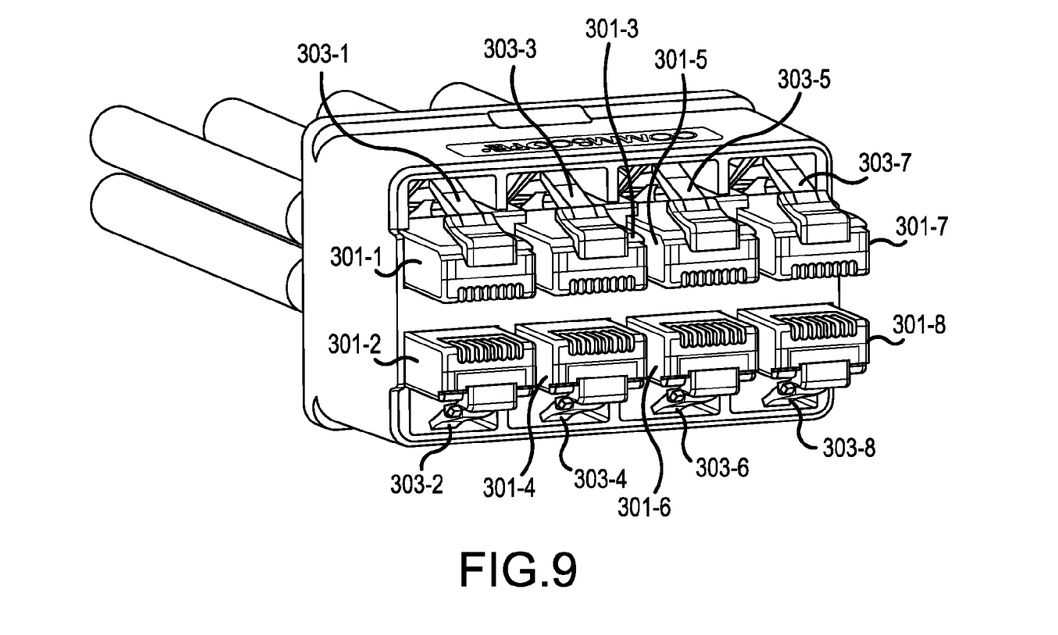
FIG. 9 is the front perspective view of the switch pack of FIG. 7 populated with connector plugs.

With reference to FIGS. 8 and 9, eight connector plugs 301-1 through 301-8 would be placed within the eight channels of the frame 111 before the first and second locking members 201 and 201' are attached to the frame 111. The connector plugs 301-1 through 301-8 would extend out of the first through eighth front openings 105-1 through 105-8 of the front face 103.

The connector plugs 301-1 through 301-8 would be free to enter the rear openings 109-1 through 109-8 of the rear face 107 of the housing 101, as the user populates the switch pack housing 101. However, once the first and second locking members 201 and 201' are snap locked to the frame 111, the connector plugs 301-1 through 301-8 would not be free to be withdrawn out of the rear openings 109-1 through 109-8 of the rear face 107 of the housing 101. More specifically, the first locking member 201, when secured to the frame, blocks removal of the first connector plug 301-1 in said first channel out of the first rear opening 109-1 by abutment of a rear side of the first connector plug 301-1 with the first blocking edge 203; blocks removal of the second connector plug 301-2 in the second channel out of the second rear opening 109-2 by abutment of a rear side of the second connector plug 301-2 with the second blocking edge 205; blocks removal of the third connector plug 301-3 in the third channel out of the third rear opening 109-3 by abutment of a rear side of the third connector plug 301-3 with the third blocking edge 207; and blocks removal of the fourth connector plug 301-4 in the fourth channel out of the fourth rear opening 109-4 by abutment of a rear side of the fourth connector plug 301-4 with the fourth blocking edge 209. The second locking member 201' blocks removal of the fifth through eighth connector plugs 301-5 through 301-8 in the same manner as the first locking member 201.

To mate the populated switch pack to a set of ports in a patch panel, a person would align the first through eighth connector plugs 301-1 through 301-8 with the ports and press the housing 101 toward the ports. The first through eighth connector plugs 301-1 through 301-8 would be pressed back against the blocking edges 203, 205, 207, 209, 203', 205', 207' and 209', respectively, due to the resistance of the plug latches 303-1 through 303-8, as the plug latches 303-1 through 303-8 compress during insertion into the ports. Eventually, all of the plug's latches 303-1 through 303-8 will snap lock into the respective mating ports. At this point, the connector plugs 301-1 through 301-8 of the switch pack are mated to the ports and cannot be unmated from the ports, even if the first and second locking members 201 and 201' are removed.

Figure 10:
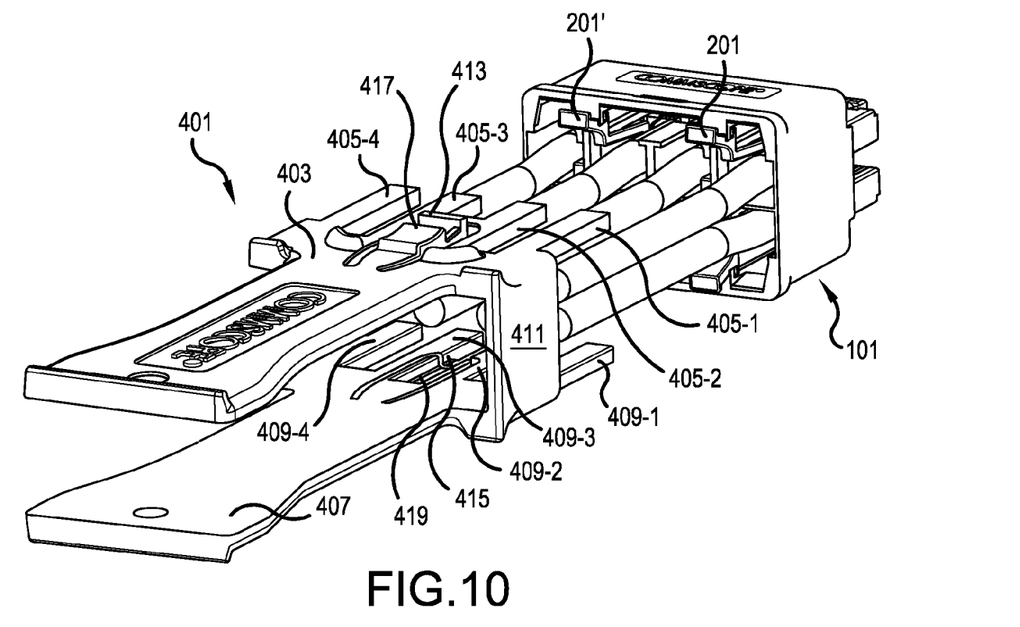
FIG. 10 is a rear perspective view of an unlatching tool prior to mating with the populated switch pack.

To un-mate the switch pack housing 101 with all of its connector plugs 301-1 through 301-8 from the ports, the present invention provides an un-mating tool 401 as shown in FIG. 10. The un-mating tool 401 includes a first wall 403 having a plurality of projecting first tabs 405-1 through 405-4, each of the first tabs 405 being sized to protrude into a channel of the first row of channels within the frame 111 so as to depress a plug latch 303 therein, e.g., plug latches 303-1, 303-3, 303-5 and 303-7. The un-mating tool 401 also includes a second wall 407 having a plurality of projecting second tabs 409-1 through 409-4, each of the second tabs 409 being sized to protrude into a channel of the second row of channels within the frame 111 so as to depress a plug latch 303 therein e.g., plug latches 303-2, 303-4, 303-6 and 303-8. A third wall 411 connects the first wall 403 to the second wall 407, and spaces the first wall 403 from the second wall 407 a proper distance so that first tabs 405 with have alignment with the latches of the connector plugs in the first row of channels and the second tabs 409 with have alignment with the latches of the connector plugs in the second row of channels.

Figure 11:
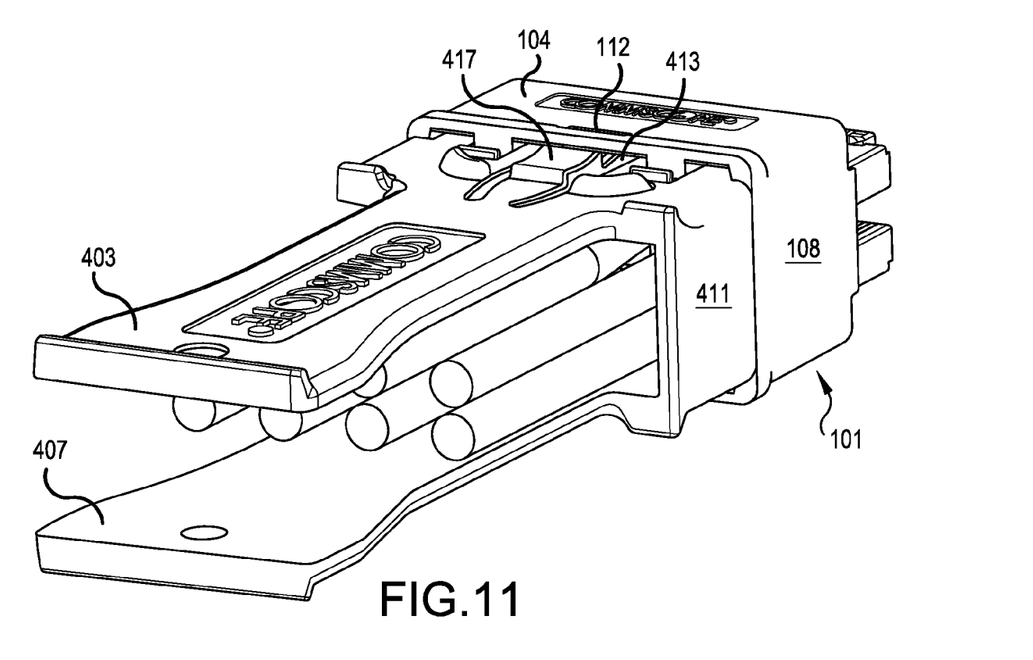
FIG. 11 is the rear perspective view of FIG. 10 with unlatching tool mated to the populated switch pack.

The first wall 403 has a first resilient latch 413. The second wall 407 has a second resilient latch 415. When the un-mating tool 401 is fully seated into the housing 101 and the latches 303 are released, the first resilient latch 413 will snap lock to the first latch receiving lip 112 of the first outer wall 104, and the second resilient latch 415 will snap lock to the second latch receiving lip 114 of the second outer wall 106. In this state, the un-mating tool 401 is attached to the housing 101 and the latches 303 will remain unlatched from the ports, as the populated switch pack housing 101 is pulled away from the ports.

The switch pack housing 101 and un-mating tool 401, as a combined unit, may be pulled away from the ports with manual force separating the plugs 301 from the ports. Once the plugs 301 are removed from the ports, the un-mating tool 401 may be separated from the switch pack housing 101 by depressing tool buttons 417 and 419 on the first and second walls 403 and 407 to deflect and release the first and second resilient latches 413 and 415 from the first and second latch receiving lips 112 and 114 of the housing 101.

Now, with reference to FIGS. 12 and 13, a release tool 501 to release a single plug from the housing 101 of the switch pack will be described. The release tool 501 has a releasing surface 503 at one distal end and a handle 505 at the opposing distal end. The releasing surface 503 is basically a flat surface, or perhaps a ramped surface, e.g., like a flat blade screw driver.

Figure 12:
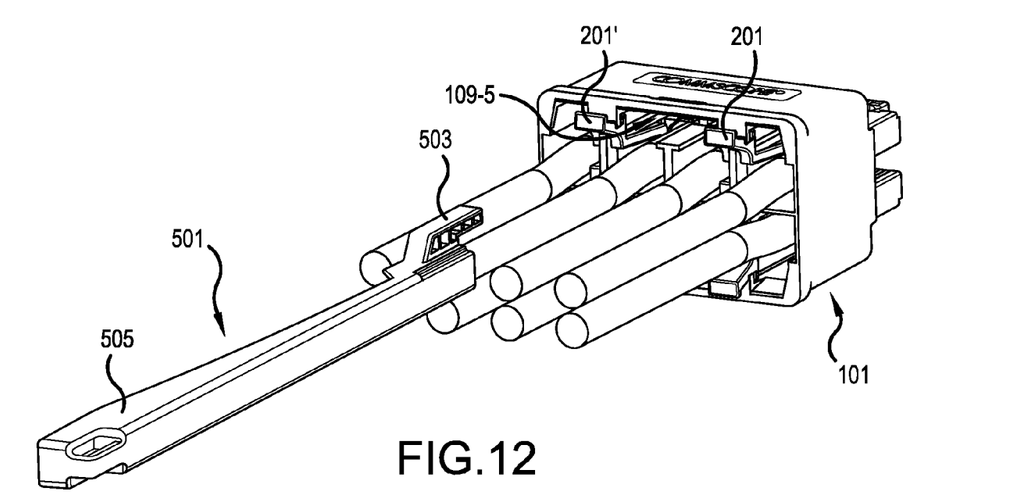
FIG. 12 is a rear perspective view of a single plug removal tool prior to interacting with a plug of the populated switch pack.
Figure 13:
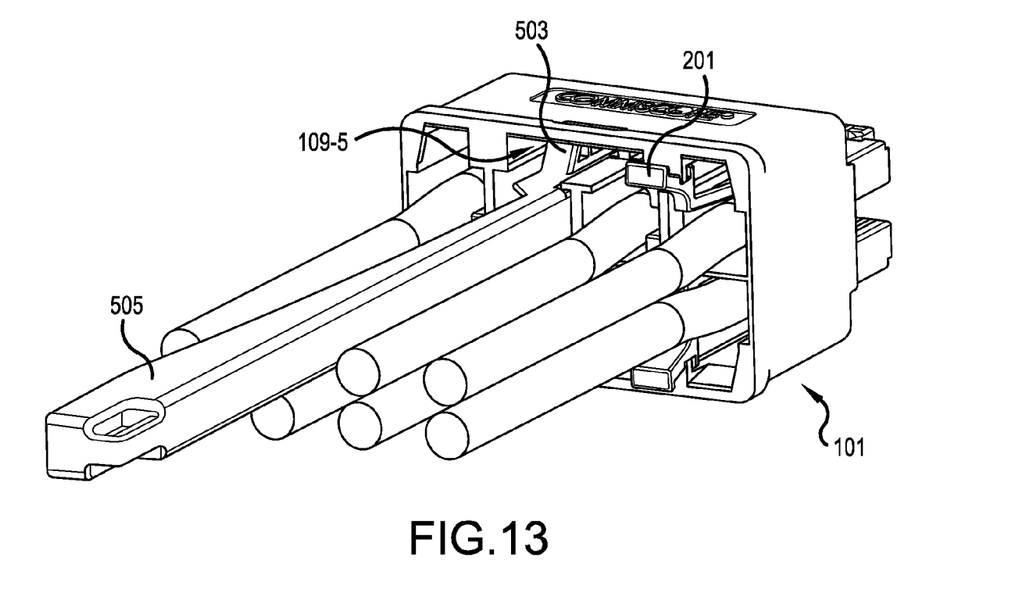
FIG. 13 is the rear perspective view of FIG. 12 with the single plug removal tool unlatching the plug of the populated switch pack.

As show in FIG. 12, the release tool 501 is aligned with a rear opening, e.g., rear opening 109-5 in FIG. 12. Before insertion into rear opening 109-5, the second locking member 201' must be removed. As shown in FIG. 13, the second locking member 201' has been removed and the release tool 501 has been pushed forward so that the releasing surface 503 has depressed the plug latch 303-5 of the connector plug 301-5. Now, the plug 301-5 may be withdrawn from the rear opening 109-5 for repair or replacement, or a new terminated cord may be inserted into the rear opening 109-5 for mating into the port, once the releasing tool 501 has been removed from the rear opening 109-5.

The releasing tool 501 provides the advantage that all of the connector plugs 301 of the switch pack housing 101 need not be unmated from their ports to permit a single connector plug, e.g. connector plug 301-5, to be unmated from its port. This can be advantageous if doing repair work during work hours to avoid disruptions, and to keep critical circuits, e.g., 911 circuits or Internet commerce circuits, connected if at all possible.

Another advantage of the present invention is that the length of the blocking edges 203, 205, 207, 209, 203', 205', 207' and 209' are extended. The blocking edges can engage the backsides of differently sized and styled plugs. Hence, the locking members 201 and 201' can be used to secure connector plugs of different sizes or styles within the channels of the frame 111 of the housing 101. For Example, as best seen in FIG. 7, because the length of the blocking edge 203 extends approximately the entire height of the cutout within the channel which holds the plug's body (as opposed to the plug's latch 303), the blocking edge 203 will abut the backsides of connector plugs 301 of any height within the channel. By this arrangement, the plurality of channels may be sized to receive at least two differently sized connector plugs, and the locking members 201 and 201', when secured to the frame 111, will block removal of either of the differently sized connector plugs out of the rear openings 109 by an abutment using the blocking edges 203, 205, 207, 209, 203', 205', 207' and 209'.

Figure 14:
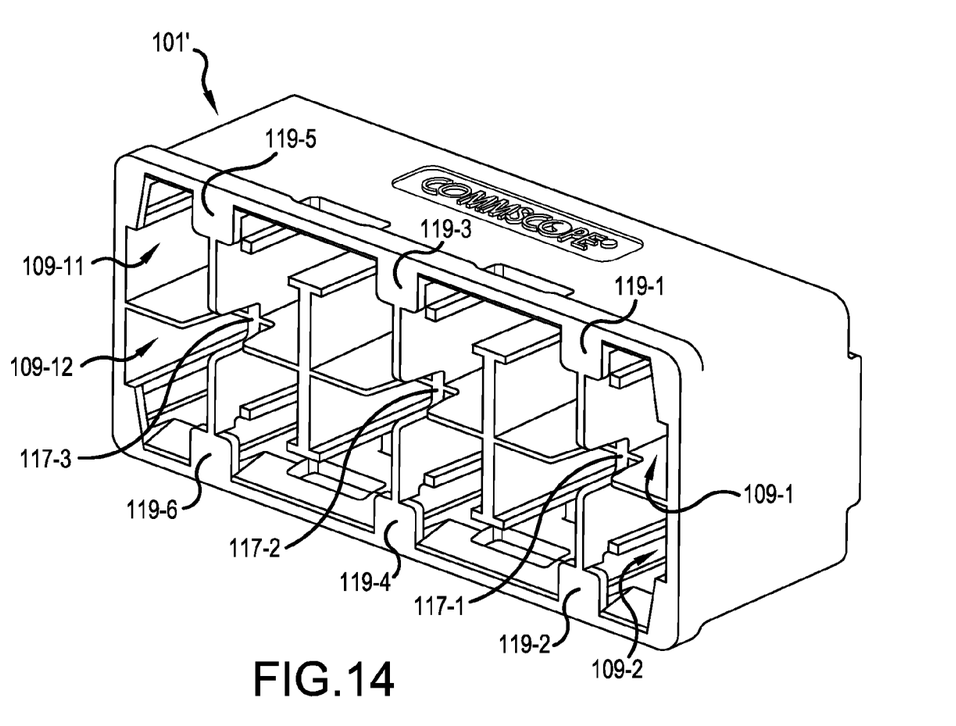
FIG. 14 is a rear perspective view of an empty housing of a switch pack, in accordance with an alternative embodiment of the present invention.
Figure 15:
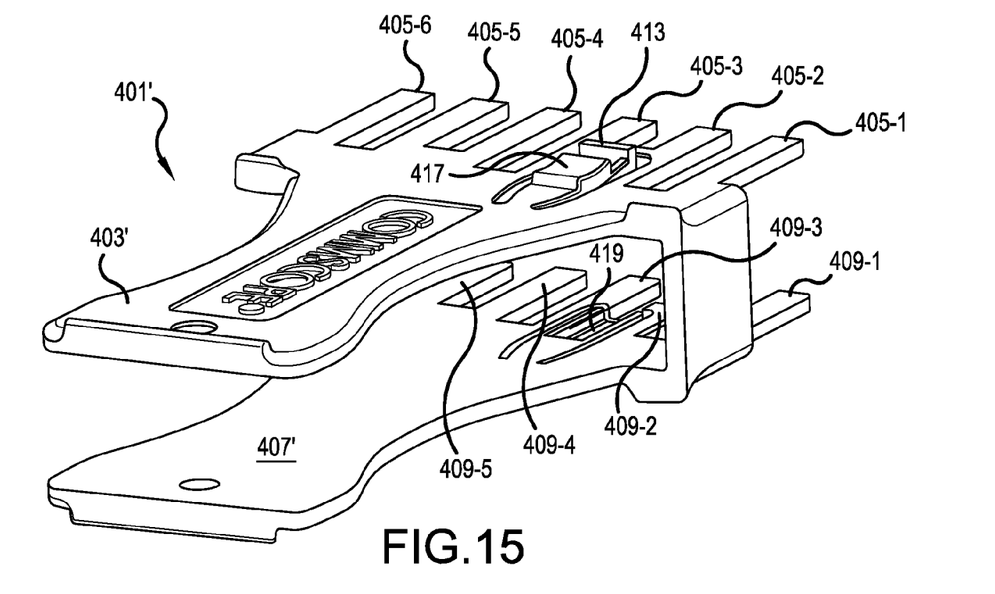
FIG. 15 is a rear perspective view of an unlatching tool, in accordance with an alternative embodiment of the present invention.

FIG. 14 illustrates that the teachings of the present invention may be applied to a switch pack housing 101' having two rows with six channels in each row, so as to hold twelve plugs 301. By adding additional retaining features 119-5 and 119-6, the housing will now accept three locking members 201, 201' and 201" to hold up to twelve plugs 301. FIG. 15 illustrates the un-mating tool 401' used to un-mate the plugs 301 of the switch pack housing 101' from ports. The same release tool 501 as described in conjunction with FIGS. 12 and 13 would work in conjunction with the switch pack housing 101' of FIG. 14.

The switch pack, in accordance with the present invention, is preferably formed of plastic, although other materials may be used while still benefiting from the advantages of the invention.

The switch pack in the above embodiments has been illustrated as holding RJ type electrical connector plugs. However, the term connector plug should be interpreted to include other types of connector plugs with latches, such as optical connector plugs, e.g., LC connector plugs.

Although the present invention has been illustrated with the housings 101 and 101' having channels to hold eight or twelve connector plugs 301, the housing may be larger or smaller to accommodate more or fewer connector plugs 301. For example, the housing could be constructed to hold four plugs or sixteen plugs, or to have more or fewer than two row of plugs. Also, two or more housings 101 may be connected in a side-by-side relationship to form switch packs to hold more plugs. For example, two eight plug switch pack housings 101 could be joined by their sidewalls 108 and 110 in side-by-side fashion to form a switch pack for holding sixteen connector plugs 301, and two un-mating tools 401 could be used to unmated the connector plugs 301 of the two joined switch pack housings 101 from ports of a patch panel.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A switch pack for holding a plurality of connector plugs and for permitting collective coupling of the plurality of connector plugs into a plurality of ports, said switch pack comprising:
    a housing having a front face with a plurality of front openings and a rear face with a plurality of rear openings, said housing having an internal frame forming a plurality of channels passing through said frame from said front openings on said front face to said rear openings on said rear face, each channel sized for receiving a respective connector plug; and
    a first locking member, which includes a first blocking edge, said first blocking edge of said first locking member entering said frame from a first rear opening of said plurality of rear openings, extending into a first channel of said plurality of channels to a limited extent such that said first blocking edge does not pass out of a first front opening of said plurality of front openings;
    wherein said first locking member is releasably secured to said frame, and wherein said first locking member, when secured to said frame, blocks removal of a first connector plug in said first channel out of said first rear opening by abutment of the first connector plug with said first blocking edge.

2. The switch pack of claim 1, wherein said first locking member snap locks with retaining features of said frame.

3. The switch pack of claim 2, wherein said first locking member is formed of a resilient material and may be manipulated by manual finger or thumb pressure to release its snap locked state with said retaining features of said frame.

4. The switch pack of claim 1, wherein said first locking member includes a second blocking edge, said second blocking edge of said first locking member entering said frame from a second rear opening of said plurality of rear openings, extending into a second channel of said plurality of channels to a limited extent such that said second blocking edge does not pass out of a second front opening of said plurality of front openings; and
    wherein said first locking member, when secured to said frame, blocks removal of a second connector plug in said second channel out of said second rear opening by abutment of the second connector plug with said second blocking edge.

5. The switch pack of claim 4, wherein said first locking member includes a third blocking edge, said third blocking edge of said first locking member entering said frame from a third rear opening of said plurality of rear openings, extending into a third channel of said plurality of channels to a limited extent such that said third blocking edge does not pass out of a third front opening of said plurality of front openings; and
    wherein said first locking member, when secured to said frame, blocks removal of a third connector plug in said third channel out of said third rear opening by abutment of the third connector plug with said third blocking edge.

6. The switch pack of claim 5, wherein said first, second and third blocking edges have extended lengths to abut connector plugs of different sizes along the extended lengths, so as to block removal of differently sized connector plugs in said first, second and third channels out of said first, second and third rear openings.

7. The switch pack of claim 5, wherein said first and second channels in said frame are adjacent to each other in a column of channels formed within said frame, and wherein said first and third channels in said frame are adjacent to each other in a row of channels formed within said frame.

8. The switch pack of claim 7, further comprising:
a second locking member, which includes a fourth blocking edge, said fourth blocking edge of said second locking member entering said frame from a fourth rear opening of said plurality of rear openings, extending into a fourth channel of said plurality of channels to a limited extent such that said fourth blocking edge does not pass out of a fourth front opening of said plurality of front openings; and
wherein said second locking member is releasably secured to said frame, and wherein said second locking member, when secured to said frame, blocks removal of a fourth connector plug in said fourth channel out of said fourth rear opening by abutment of the fourth connector plug with said fourth blocking edge.

9. The switch pack of claim 8, wherein said third and fourth channels in said frame are adjacent to each other in said row of channels formed within said frame.

10. The switch pack of claim 1, wherein said first channel of said plurality of channels is sized to receive at least two differently sized connector plugs, and wherein said first locking member, when secured to said frame, blocks removal of either of the two differently sized connector plugs in said first channel out of said first rear opening by an abutment using said first blocking edge.

11. The switch pack of claim 1, wherein said plurality of channels is formed by two rows of channels with four channels in each row.

12. The switch pack of claim 11, further comprising:
eight connector plugs residing within said plurality of channels, and wherein said connector plugs are electrical plugs with latches to snap lock said connector plugs into ports.

13. The switch pack of claim 11, further comprising:
eight connector plugs residing within said plurality of channels, and wherein said connector plugs are optical plugs with latches to snap lock said connector plugs into ports.

14. The switch pack of claim 1, wherein said plurality of channels is formed by two rows of channels with six channels in each row.

15. The switch pack of claim 1, wherein said housing further comprises:
a first outer wall;
an opposite, second outer wall, with said frame being disposed between said first and second outer walls;
a first latch receiving lip on said first outer wall; and
a second latch receiving lip on said second outer wall.

16. The switch pack of claim 15, wherein said first lip is an edge of a first through hole passing through said first outer wall, and said second lip is an edge of a second through hole passing through said second outer wall.

17. The switch pack of claim 1, further comprising:
a plurality of connector plugs secured within said plurality of channels, each channel holding one connector plug of said plurality of connector plugs, such that its one connector plug extends out of one of said front openings in said front face to a limited extent.

18. A release tool for a switch pack, said release tool comprising:
a first wall having a plurality of projecting first tabs, each of said first tabs being sized to protrude into a channel of a first row of channels so as to depress a plug latch;
a second wall having a plurality of projecting second tabs, each of said second tabs being sized to protrude into a channel of a second row of channels so as to depress a plug latch; and
a third wall connecting said first wall to said second wall and spacing said first tabs from said second tabs so as to have alignment with the latches of the plugs in the first and second rows of channels.

19. The release tool of claim 18, further comprising:
a first resilient latch on said first wall located for interaction with a first latch receiving lip of a switch pack housing; and
a second resilient latch on said second wall located for interaction with a second latch receiving lip of the switch pack housing.

20. A switch pack for holding a plurality of connector plugs and for permitting collective coupling and uncoupling of the plurality of connector plugs into a plurality of ports, said switch pack comprising:
a housing having a front face with a plurality of front openings and a rear face with a plurality of rear openings, said housing having an internal frame forming a plurality of channels passing through said frame from said front openings on said front face to said rear openings on said rear face, each channel sized for receiving a respective connector plug, wherein said housing further includes: a first outer wall; an opposite, second outer wall, with said frame being disposed between said first and second outer walls; a first latching receiving lip on said first outer wall; and a second latch receiving lip on said second outer wall;
a first locking member, which includes a first blocking edge, said first blocking edge of said first locking member entering said frame from a first rear opening of said plurality of rear openings, extending into a first channel of said plurality of channels to a limited extent such that said first blocking edge does not pass out of a first front opening of said plurality of front openings, wherein said first locking member is releasably secured to said frame, and wherein said first locking member, when secured to said frame, blocks removal of a first connector plug in said first channel out of said first rear opening by abutment of the first connector plug with said first blocking edge; and
a release tool including: a first wall having a plurality of projecting first tabs, each of said first tabs being sized to protrude into a channel of a first row of said plurality of channels so as to depress a plug latch; a second wall having a plurality of projecting second tabs, each of said second tabs being sized to protrude into a channel of a second row of said plurality of channels so as to depress a plug latch; a third wall connecting said first wall to said second wall and spacing said first tabs from said second tabs so as to have alignment with the latches of the plugs in the first and second rows of channels; a first resilient latch on said first wall located for interaction with said first latch receiving lip of said switch pack housing; and a second resilient latch on said second wall located for interaction with said second latch receiving lip of said switch pack housing.

* * * * *